United States Patent
Noda

(10) Patent No.: US 12,371,364 B2
(45) Date of Patent: Jul. 29, 2025

(54) POROUS GLASS BASE MATERIAL MANUFACTURING APPARATUS, METHOD FOR MANUFACTURING POROUS GLASS BASE MATERIAL, AND METHOD FOR MANUFACTURING GLASS BASE MATERIAL FOR OPTICAL FIBER

(71) Applicant: Shin-Etsu Chemical Co., Ltd., Tokyo (JP)

(72) Inventor: Naoto Noda, Ibaraki-ken (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 302 days.

(21) Appl. No.: 17/921,751

(22) PCT Filed: Apr. 7, 2021

(86) PCT No.: PCT/JP2021/014742
§ 371 (c)(1),
(2) Date: Oct. 27, 2022

(87) PCT Pub. No.: WO2021/220747
PCT Pub. Date: Nov. 4, 2021

(65) Prior Publication Data
US 2023/0167004 A1 Jun. 1, 2023

(30) Foreign Application Priority Data
May 1, 2020 (JP) .................. 2020-081549

(51) Int. Cl.
*C03B 37/018* (2006.01)
*C03B 19/10* (2006.01)
(52) U.S. Cl.
CPC .......... *C03B 37/018* (2013.01); *C03B 19/106* (2013.01)

(58) Field of Classification Search
None
See application file for complete search history.

(56) References Cited

U.S. PATENT DOCUMENTS

| 2005/0155390 A1* | 7/2005 | Nagasu | C03B 37/01413 138/148 |
| 2007/0089464 A1* | 4/2007 | Kim | C03B 37/01413 65/488 |

(Continued)

FOREIGN PATENT DOCUMENTS

| CN | 105953029 B | * 12/2018 | ........... B32B 15/043 |
| JP | 2000-220790 | 8/2000 | |

(Continued)

OTHER PUBLICATIONS

WO2012008406A1 Google Patents Machine Translation Retrieved Oct. 21, 2024. (Year: 2024).*

(Continued)

*Primary Examiner* — Lisa L Herring
(74) *Attorney, Agent, or Firm* — Greenblum & Bernstein, P.L.C.

(57) ABSTRACT

The porous glass base material manufacturing apparatus releases gas of organic siloxane raw materials into the flame of a group of burners that moves relative to a starting base material along the longitudinal direction of the starting base material rotating around a rotation axis along the longitudinal direction to form soot of porous glass particles on the surface of the starting base material. The porous glass base material manufacturing apparatus is equipped with a vaporizer that vaporizes liquid raw materials containing organic siloxane in a liquid state supplied from a raw material tank to make a raw material mixed gas mixed with raw material gas and carrier gas and a raw material gas pipe that supplies (Continued)

the raw material mixed gas to the burner. The raw material gas pipe is insulated and kept warm by double insulation.

5 Claims, 4 Drawing Sheets

(56) References Cited

U.S. PATENT DOCUMENTS

| | | |
|---|---|---|
| 2010/0323871 A1 | 12/2010 | Koike et al. |
| 2012/0040138 A1 | 2/2012 | Weidinger et al. |
| 2013/0133378 A1 | 5/2013 | Fabian |
| 2013/0205832 A1 | 8/2013 | Miyasaka et al. |
| 2015/0007611 A1 | 1/2015 | Badeke et al. |
| 2017/0037501 A1 | 2/2017 | Oozeki et al. |
| 2019/0092677 A1 | 3/2019 | Oozeki |
| 2021/0292222 A1* | 9/2021 | Noda ............... C03B 37/01413 |
| 2021/0387106 A1* | 12/2021 | Otani .................. B01D 1/0064 |

FOREIGN PATENT DOCUMENTS

| | | |
|---|---|---|
| JP | 2009-67604 | 4/2009 |
| JP | 2013-177297 | 9/2013 |
| JP | 2015-502317 | 1/2015 |
| JP | 2015-505291 | 2/2015 |
| JP | 2017-36172 | 2/2017 |
| JP | 2017-197402 | 11/2017 |
| WO | 2012/008406 | 1/2012 |
| WO | WO-2020039893 A1 * | 2/2020 ....... C03B 37/01413 |

OTHER PUBLICATIONS

Bronkhorst, "CEM: Vapor Generation System with Precise Flow Control", https://psctexas.com/cem-liquid-delivery-system-with-vapour-control/, May 15, 2019. (Year: 2019).*
CN105953029A EPO Machine Translation Retrieved Nov. 22, 2024. (Year: 2024).*
International Search Report, in International Patent Application No. PCT/JP2021/014742, Jul. 6, 2021, with English translation.
Written Opinion of the International Searching Authority, in International Patent Application No. PCT/JP2021/014742, dated Jul. 6, 2021, with English translation.
European Search Report in related European application No. 21795554.1, dated Apr. 4, 2024.

* cited by examiner

POROUS GLASS BASE MATERIAL MANUFACTURING APPARATUS, METHOD FOR MANUFACTURING POROUS GLASS BASE MATERIAL, AND METHOD FOR MANUFACTURING GLASS BASE MATERIAL FOR OPTICAL FIBER

TECHNICAL FIELD

The present invention relates to a porous glass base material manufacturing apparatus, a method for manufacturing porous glass base material, and a method for manufacturing glass base material for optical fiber.

BACKGROUND ART

Conventionally, a method for manufacturing a porous glass fine particle body is known, in which glass particles are deposited on a starting base material such as a glass rod to form soot. By dehydrating and sintering this type of porous glass fine particles body, an optical fiber base material for manufacturing optical fibers and the like can be obtained.

The porous glass base material is manufactured, for example, by externally depositing $SiO_2$ fine particles by the OVD method or the like on a core base material manufactured by the VAD method or the like and sintering the deposited body. Conventionally, silicon tetrachloride ($SiCl_4$) is widely used as a silicon compound raw material for the external deposition of $SiO_2$ particles on the base material.

$$SiCl_4 + 2H_2O \rightarrow SiO_2 + 4HCl \quad \text{[Chemical formula 1]}$$

This reaction produces hydrochloric acid as a byproduct, which is corrosive to metals when mixed with moisture, so care must be taken in the materials used for the manufacturing apparatus and exhaust gas temperature control. Furthermore, the installation of a facility to recover and process hydrochloric acid from the exhaust will increase costs.

As mentioned above, silicon tetrachloride ($SiCl_4$) is widely used as a silicon compound raw material, but sometimes a halogen-free organosilicon compound that does not contain Cl (chlorine) in its molecule is used as a starting material for $SiO_2$ particles (see, for example, Patent documents 1-4). An example of such a halogen-free organic silicon compound is octamethylcyclotetrasiloxane (OMCTS), which is a high-purity organic siloxane available on an industrial scale.

When OMCTS is used as the raw material, $SiO_2$ fine particles are produced by the reaction shown in the following Chemical formula 2.

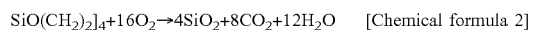

$$SiO(CH_2)_2]_4 + 16O_2 \rightarrow 4SiO_2 + 8CO_2 + 12H_2O \quad \text{[Chemical formula 2]}$$

As described above, when the halogen-free organic siloxanes typified by OMCTS are used as the silicon compound raw material supplied to the burner, hydrochloric acid is not discharged. This allows for greater flexibility in the handling of materials for manufacturing apparatus and exhaust. In addition, there is no need to install equipment to recover hydrochloric acid and treat the recovered hydrochloric acid, which is expected to reduce costs.

Furthermore, OMCTS is expected to have the advantage that the heat of combustion is very large, and the amount of combustible gas such as hydrogen required for combustion can be kept lower than that of the conventional method using $SiCl_4$.

PRIOR ART REFERENCES

Patent Documents

Patent Document 1: JP2013-177297A
Patent Document 2: JP2015-505291A
Patent Document 3: JP2017-036172A
Patent Document 4: JP2017-197402A

SUMMARY OF THE INVENTION

Problems to be Solved by the Invention

On the other hand, octamethylcyclotetrasiloxane, which is the organic siloxane raw material, has a high standard boiling point of 175° C. and is prone to re-liquefaction when cooled in the raw material gas pipe. In addition, since the raw material gas pipe is heated at a high temperature using heaters, the power consumption of the heaters becomes large, which increases the cost.

The present invention has been made in view of the above-mentioned problems, and an object of the present invention is to provide a porous glass base material manufacturing apparatus, a method for manufacturing porous glass base material, and a method for manufacturing glass base material for optical fiber, which can prevent re-liquefaction of the raw material in the organic siloxane raw material typified by octamethylcyclotetrasiloxane (OMCTS).

Means for Solving the Problems

To solve the above problem, a porous glass base material manufacturing apparatus according to the present invention releases gas of organic siloxane raw materials into the flame of a group of burners that moves relative to a starting base material along the longitudinal direction of the starting base material rotating around a rotation axis along the longitudinal direction to form soot of porous glass particles on a surface of the starting base material. The porous glass base material manufacturing apparatus is equipped with a vaporizer that vaporizes liquid raw materials containing organic siloxane in a liquid state supplied from a raw material tank to make a raw material mixed gas mixed with raw material gas and carrier gas and a raw material gas pipe that supplies the raw material mixed gas to the burner. The raw material gas pipe is insulated and kept warm by double insulation, which is a combination of an inner layer heat-insulation material provided on the outside of the raw material gas pipe and an outer layer heat-insulation material provided on the outside of the inner layer heat-insulation material.

In the present invention, an insulation material with a heat resistance temperature of 160° C. or higher may be used for the inner layer heat-insulation material, and an insulation material with thermal conductivity of 0.05 W/m/K or less (20° C.) may be used for the outer layer heat-insulation material.

In the present invention, the organic siloxane raw material may be octamethylcyclotetrasiloxane (OMCTS).

In the present invention, the raw material gas pipe may be heated and kept at a temperature of 140-220° C.

The porous glass base material manufacturing apparatus may be further equipped with a liquid mass flow controller that controls the flow rate of the organic siloxane raw material in the liquid state supplied from the raw material tank to the vaporizer. The vaporizer may then mix the organic siloxane raw material with the carrier gas and vaporize the liquid raw material to make the raw material mixed gas, in which the raw material gas and carrier gas are mixed.

Alternatively, the porous glass base material manufacturing apparatus may be further equipped with a liquid mass flow meter that measures the flow rate of organic siloxane raw material in a liquid state supplied from the raw material tank and a liquid gas mixer that has a control valve that controls the flow rate of liquid raw material based on feedback from the liquid mass flow meter and mixes liquid raw material and carrier gas. The vaporizer may then vaporize the liquid raw material mixed with the carrier gas by the liquid gas mixer to make the raw material mixed gas in which the raw material gas and carrier gas are mixed.

A method for manufacturing porous glass base material according to the present invention comprises: a step of supplying a liquid raw material containing an organic siloxane raw material in a liquid state supplied from a raw material tank to a vaporizer; a step of mixing the liquid raw material of the organic siloxane with a carrier gas in a vaporizer and vaporize the liquid raw material to make the raw material mixed gas in which the raw material gas and the carrier gas are mixed; a step of supplying the raw material mixed gas to a burner via a raw material gas pipe; and a step of forming soot of porous glass particles on the surface of a starting base material by releasing the raw material mixed gas into the flame of the burner that moves relative to the starting base material along the longitudinal direction of the starting base material rotating around a rotation axis along the longitudinal direction. The raw material gas pipe is insulated and kept warm by double insulation, which is a combination of an inner layer heat-insulation material provided on the outside of the raw material gas pipe and an outer layer heat-insulation material provided on the outside of the inner layer heat-insulation material.

The method for manufacturing glass base material for optical fiber includes a step of obtaining a porous glass base material by the above-mentioned method for manufacturing porous glass base material and a step of performing dehydration and sintering treatment by heating the porous glass base material in a heating furnace.

Effects of Invention

According to the present invention, the re-liquefaction of raw material gas of organic siloxane raw materials such as octamethylcyclotetrasiloxane (OMCTS) in the porous glass base material manufacturing apparatus can be prevented.

DESCRIPTION OF EMBODIMENTS

Figure 1:
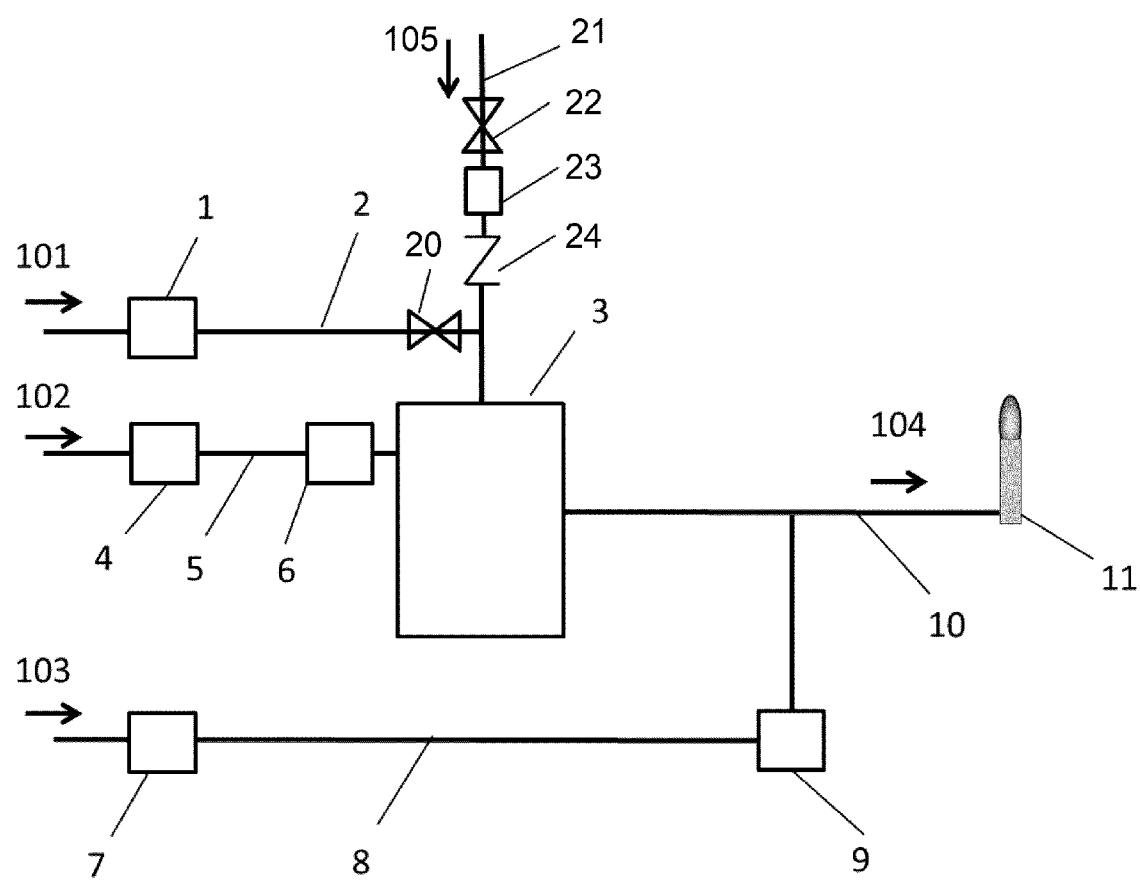
FIG. 1 shows a supply flow diagram around a vaporizer in the manufacturing apparatus of the porous glass preform according to the first embodiment.

Hereinafter, based on the embodiment, the present invention will be described in more detail. In the following description, portions already described are denoted by the same reference numerals, and the description of the portion once described will be omitted accordingly.

First Embodiment

FIG. 1 shows a supply flow diagram around a vaporizer according to the first embodiment. A raw material liquid 101 is pumped from a raw material tank (not shown), and the flow rate thereof is controlled by a liquid mass flow controller 1. The raw material liquid 101 is supplied to a vaporizer 3 through a raw material liquid pipe 2. The raw material liquid 101 is made into fine droplets by a carrier gas 102, which is also introduced into the vaporizer 3, and is heated to vaporize the raw material liquid 101 and become a raw material mixed gas 104, which is a mixture of the raw material gas and the carrier gas 102. The flow rate of the carrier gas 102 is controlled by the gas mass flow controller 4, and the carrier gas is supplied to the vaporizer 3 through a carrier gas pipe 5. In order to accelerate the vaporization of the raw material liquid 101 in the vaporizer 3, the carrier gas 102 may be supplied while being preheated using a heat exchanger 6. As the carrier gas 102, an inert gas such as nitrogen, argon and helium, oxygen, or a mixed gas of oxygen and the inert gas may be used. The raw material mixed gas 104 is supplied to a burner 11 via a raw material gas pipe 10. An open/close valve 20 is provided in the raw material liquid pipe 2 immediately before the vaporizer 3, and after the supply of the raw material liquid 101 is completed, the raw material liquid 101 that has accumulated in the open/close valve 20 and piping of the vaporizer 3 is purged with purge gas 105. The purge gas pipe 21 is equipped with an open/close valve 22, flow rate control means 23 (e.g., flow rate control valve), and a check valve 24 are provided.

At this time, in order to promote combustion of the raw material gas, oxygen as premixed gas 103 may be further mixed with the raw material mixed gas 104 before being supplied to the burner 11. The flow rate of the premixed gas 103 is controlled by the gas mass flow controller 7, and the premixed gas 103 is mixed in the raw material gas pipe 10 through a premixed gas pipe 8. To prevent re-liquefaction of raw material gas in the raw material mixed gas 104, oxygen, which is the premixed gas 103, may be supplied while being preheated using a heat exchanger 9.

From the viewpoint of efficiently vaporizing the raw material liquid 101 and preventing polymerization of the raw material liquid 101, it is preferable to set the temperature of the vaporizer 2 to a temperature of 160° C. or more and 220° C. or less when OMCTS is used as the organic siloxane raw material. When the temperature is low, the vapor pressure of the raw material liquid is lowered, and when the temperature is lower than 160° C., the vaporization efficiency significantly decreases. When the temperature exceeds 220° C., the polymer derived from the raw material liquid 101 may be deposited. The raw material gas pipe 10 to the burner 11 downstream of the vaporizer 3 is preferably set at a temperature of 140° C. or more and 220° C. or less to prevent re-liquefaction and polymerization of the raw material gas in the raw material mixed gas 104. More preferably, the temperature of the vaporizer 3 and the raw material gas pipe 10 should be set to a temperature of 160° C. or more and 190° C. or less. It is preferable that the raw material gas pipe 10 is equipped with a heater to heat it to the desired temperature.

Figure 2:
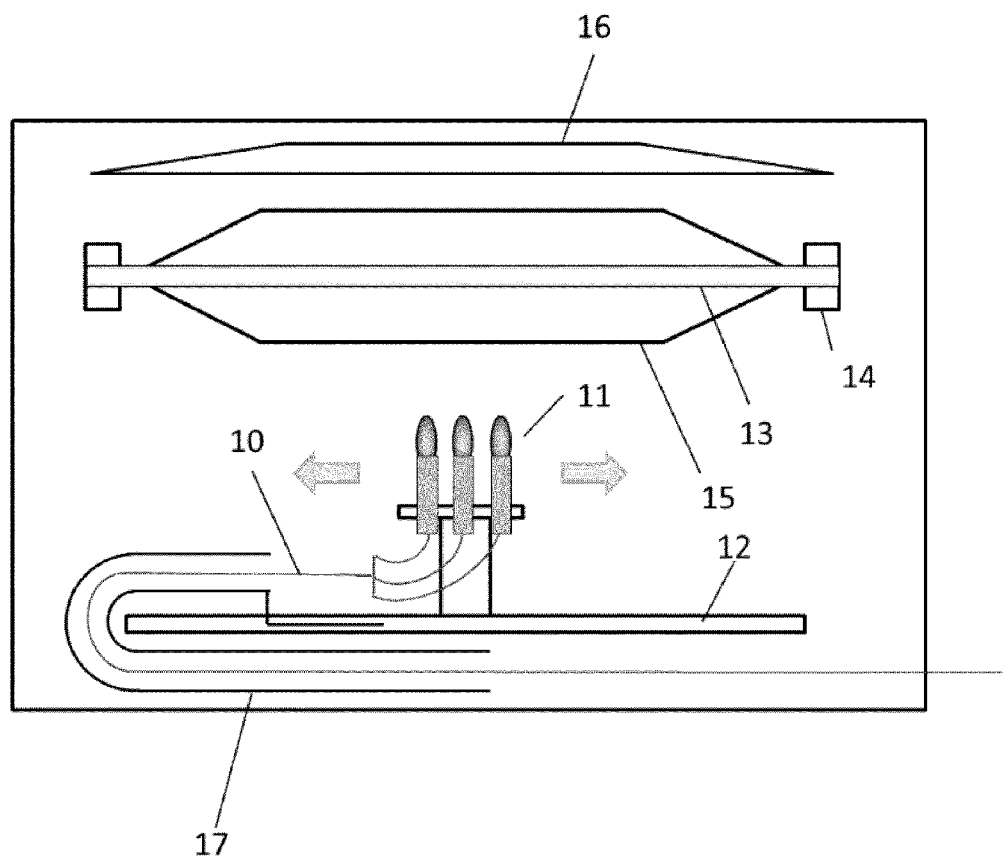
FIG. 2 illustrates a schematic diagram of the porous glass base material manufacturing apparatus in the first embodiment.

FIG. 2 illustrates a schematic diagram of the porous glass base material manufacturing apparatus in the first embodiment. The burner 11 moves in parallel with the guide mechanism 12 using a traverse motor. The starting base material 13 is attached to a rotating mechanism 14 and rotated in a certain direction. While the burner 11 repeatedly moves parallel to the longitudinal direction of the starting base material 13, $SiO_2$ fine particles are adhered to the starting base material 13 by the raw material gas emitted from the burner 11, and soot deposit 15 is produced. The undeposited $SiO_2$ particles that did not adhere to the soot deposit 15 are discharged out of the system through the exhaust hood 16. The exhaust hood 16 can be either a local exhaust structure or a total exhaust structure. Each gas pipe supplying the burner 11 moves following the burner 11, which repeatedly moves in parallel. The pipe for each gas supplied to the burner 11 should have mobility, and each gas pipe should be housed inside a movable cable protector 17, such as a cableveyor (registered trademark of Tsubakimoto Chain Co.). This allows each gas pipe to follow the burner 11.

When the raw material gas pipe 10 is housed in the movable cable protector 17 and a heater is used to heat the raw material gas pipe 10, the raw material gas pipe 10 is constantly subjected to tensile and bending stresses. As a result, heaters are more likely to break due to fatigue, and in configurations that use a heat transfer fluid, the heat transfer fluid piping is more likely to break due to fatigue. For this reason, it is preferable to use no heaters in the raw material gas pipe 10 inside the movable cable protector 17, but only heat insulation.

However, if no heater is used and only heat insulation is used, the raw material gas pipe 10 in the movable cable protector 17 will cool, increasing the possibility that the raw material gas in the raw material mixed gas 104 will re-liquefy. Therefore, it is necessary to devise an insulation method to avoid the raw gas pipe 10 cooling.

By improving the insulation of the raw material gas pipe 10, the amount of heat dissipation can be reduced at the raw material gas pipe 10 sites heated by the heater except in the movable cable protector 17, and the temperature can be maintained constant at low power, contributing to a reduction in the power consumption of the heater.

Insulation materials for piping must have high thermal insulation performance, high heat resistance temperature, low cost, easy installation, small density, high durability, low dust generation, and flexibility. However, it is difficult to select an insulation material that meets all these requirements.

In particular, octamethylcyclotetrasiloxane, which is an organic siloxane raw material, has a high standard boiling point of 175° C. Therefore, a heat-resistant temperature of at least 160° C. is required for insulation materials suitable for insulating the raw material gas pipe 10. Piping insulation materials with high heat resistance temperatures include rock wool, glass wool, polyimide, and silicone sponge. Rock wool and glass wool have high heat resistance temperatures and high insulation performance but are not suitable for use within the movable cable protector 17. Polyimide also has a high heat resistance temperature and high thermal insulation performance but is relatively expensive.

Silicone sponge tubes have a heat resistance temperature of 200° C., are easy to install, flexible, and highly durable. On the other hand, the thermal conductivity is 0.2 W/m/K (20° C.), which is higher than that of inorganic insulation materials. Therefore, in the case of insulation only with silicone sponge tubes, the amount of heat dissipation is large, and the raw material gas pipe 10 is easily cooled. In particular, the possibility of re-liquefaction of the raw material gas in the raw material mixed gas 104 increases in the raw material gas pipe 10 in the moving cable protector 17, where no heater is used, and only heat insulation is preferred. In addition, because of the large amount of heat dissipation, the power consumption required to maintain the temperature in the raw material gas pipe 10 in areas where heaters are used is large, which leads to increased costs.

Figure 3:
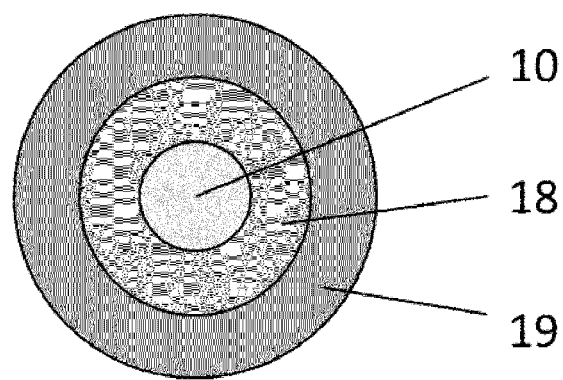
FIG. 3 shows a cross-sectional view of the heat-insulating structure of the raw material gas pipe in the first embodiment.

FIG. 3 shows a cross-sectional view of the heat-insulating structure of the raw material gas pipe 10 in the first embodiment. It has a double heat-insulating structure with an inner layer heat-insulation material 18 covering the raw material gas piping 10 and an outer layer heat-insulation material 19 covering the outside. A silicone sponge tube is used as the inner layer heat-insulation material 18, and an insulation material with even lower thermal conductivity is used as the outer layer heat-insulation material 19. For the outer layer heat-insulation material 19, it is particularly desirable to use insulation material with thermal conductivity of 0.05 W/m/K or less (20° C.). Since the outer layer heat-insulation material 19 is not wrapped directly around piping or heaters that are kept at temperatures near 180° C., insulation material with a heat resistance temperature below the surface temperature of the outer layer heat-insulation material 18 can be used. Although it depends on the thickness and thermal conductivity of the inner layer heat-insulation material 18, the heat resistance temperature of the outer layer heat-insulation material 19 is preferably about 120° C. Specifically, as the outer layer heat-insulation material 19, for example, AEROFLEX (registered trademark), which is an insulation material with an EPDM (ethylene-propylene-diene rubber) synthetic rubber elastomer structure with an independent bubble structure, may be used.

Second Embodiment

Figure 4:
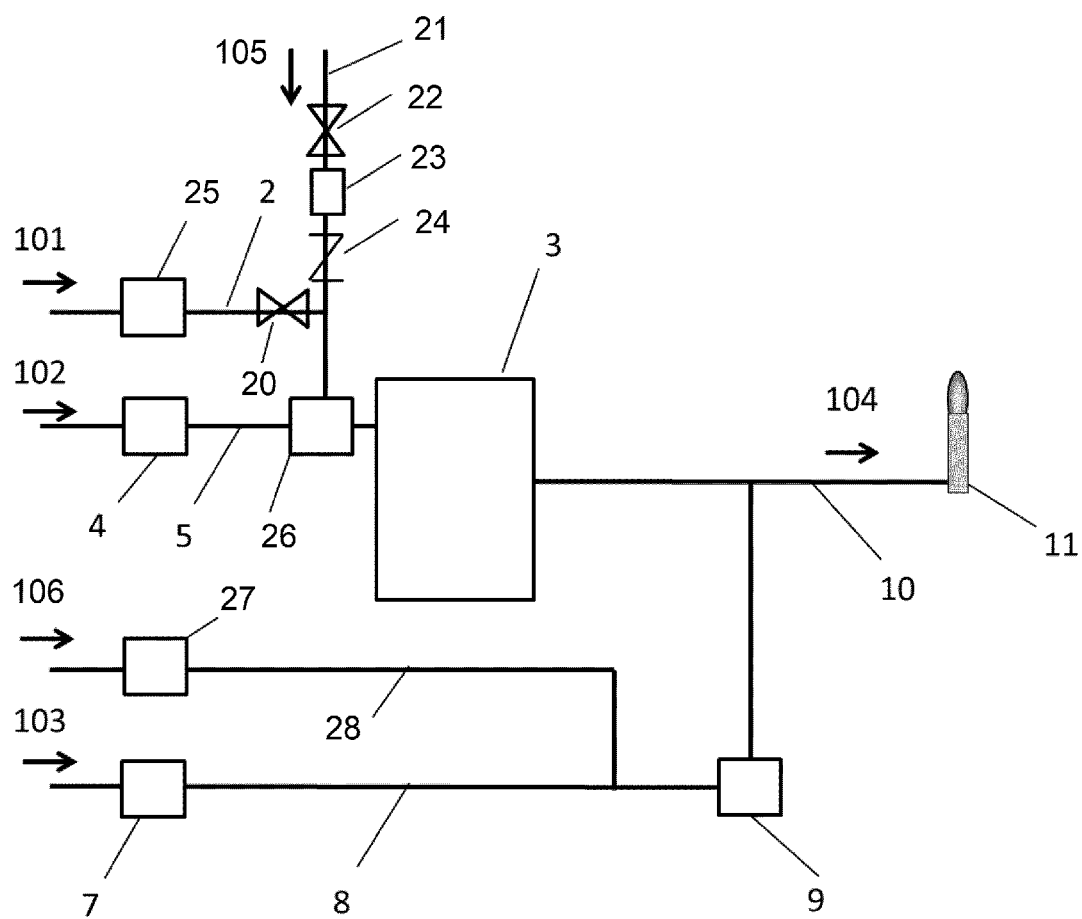
FIG. 4 shows a supply flow diagram around a vaporizer in the manufacturing apparatus of the porous glass preform according to the second embodiment.

FIG. 4 shows a supply flow diagram around the vaporizer according to the second embodiment. The raw material liquid 101 is flow-measured by the liquid mass flow meter 25 and fed through the raw material liquid pipe 2 to a liquid gas mixer 26. The liquid gas mixer 26 has a control valve that controls the flow rate of the liquid raw material 101. The flow rate of the liquid raw material 101 is adjusted by feedback control from the liquid mass flow meter 25. The raw material liquid 101 is mixed in the liquid gas mixer 26 with the carrier gas 102, which is also introduced into the liquid gas mixer 26, and heated in the downstream vaporizer 3 to become the raw material mixed gas 104. The flow rate of the carrier gas 102 is controlled by the gas mass flow controller 4, and the carrier gas is supplied to the liquid gas mixer 26 through the carrier gas pipe 5. As the carrier gas 102, an inert gas such as nitrogen, argon and helium, oxygen, or a mixed gas of oxygen and the inert gas may be used. The raw material mixed gas 104 is supplied to the burner 11 via the raw material gas pipe 10. An open/close valve 20 is provided in the raw material liquid pipe 2 immediately before the liquid gas mixer 26, and after the supply of the raw material liquid 101 is completed, the raw material liquid 101 that has accumulated in the open/close valve 20 and piping of the liquid gas mixer 26 is purged with purge gas 105. The purge gas pipe 21 is equipped with an open/close valve 22, The purge gas pipe 21 is equipped with an open/close valve 22, flow rate control means 23, and a check valve 24 are provided.

At this time, in order to promote combustion of the raw material gas, oxygen as premixed gas 103 may be further mixed with the raw material mixed gas 104 before being supplied to the burner 11. The flow rate of the premixed gas 103 is controlled by the gas mass flow controller 7, and the premixed gas 103 is mixed in the raw material gas pipe 10 through the premixed gas pipe 8. The raw material gas pipe 10 has a double insulation structure similar to that of the raw material gas pipe in the first embodiment. To prevent re-liquefaction of the raw material mixed gas 104, oxygen, which is the premixed gas 103, may be supplied while being preheated using the heat exchanger 9. In order to prevent backfires in the burner 11, the raw material mixed gas may be further mixed with a carrier gas 106. The flow rate of the carrier gas 106 is controlled by the gas mass flow controller 27, and carrier gas 106 is mixed in the raw material gas pipe 10 through a carrier gas pipe 28. As the carrier gas 106, an inert gas such as nitrogen, argon, and helium may be used. Like the premixed gas 103, the carrier gas 106 may also be preheated and supplied using the heat exchanger 9 to prevent re-liquefaction of the raw material mixed gas 104.

The porous glass base material manufacturing apparatus configured as described above may be combined with a heating furnace for dehydrating and sintering the porous glass base material obtained from the porous glass matrix manufacturing apparatus to constitute an optical fiber base material manufacturing apparatus for obtaining a transparent vitrified optical fiber base material.

EXAMPLES

Example 1

In the porous glass base material manufacturing apparatus, the raw material gas pipe 10 was heated by an electric heater to a temperature of 190° C. up to the inlet of the movable cable protector 17. No electric heater was used for the raw material gas pipe 10 housed in the movable cable protector 17, and only heat insulation was used. The length of the raw material gas pipe 10 housed within the movable cable protector 17 was 3 [m].

A ⅜-inch (0.9525 cm) PFA tube was used as the raw material gas pipe 10. A double insulation structure was used for heat insulation, with silicone sponge tubes as the inner layer heat-insulation material 18 and Aeroflex as the outer layer heat-insulation material 19.

The thickness of the silicone sponge tube, which is the inner layer heat-insulation material 18, was set to 0.005 [m]. The thickness Aeroflex, which is the outer layer heat-insulation material 19, was set to 0.01 [m].

The supply flow around the vaporizer was as shown in FIG. 1. OMCTS was used as the raw material liquid 101. The space above the raw material liquid in the raw material tank was filled with $N_2$, an inert gas. The internal pressure of the raw material tank was set at 0.02 MPa by gauge pressure. A diaphragm pump was used as the feeding pump, and the discharge pressure of the pump was kept at 0.5 MPa. The pressure on the raw material liquid 101 just before vaporizer 3 was set to 0.02-0.3 MPa. $N_2$ was used as carrier gas. $O_2$ was used as the premixed gas 103. The flow rate of the raw material mixed gas 104 flowing through the raw material gas pipe 10 was adjusted in the range of 20 to 80 [SLM] and supplied to the burner 11.

When the raw material mixed gas 104 was fed into the raw material gas pipe 10 under the above conditions, no re-liquefaction occurred in the raw material gas pipe 10 or in the burner 11.

Example 2

A double insulation structure was used for heat insulation of the raw material gas pipe 10, with silicone sponge tubes as the inner layer heat-insulation material 18 and Aeroflex as the outer layer heat-insulation material 19. The thickness of the silicone sponge tube, which is the inner layer heat-insulation material 18, was set to 0.005 [m]. The thickness Aeroflex, which is the outer layer heat-insulation material 19, was set to 0.01 [m].

The supply flow around the vaporizer was as shown in FIG. 4. OMCTS was used as the raw material liquid 101. The space above the raw material liquid in the raw material tank was filled with $N_2$, an inert gas. The internal pressure of the raw material tank was set at 0.02 MPa by gauge pressure. A diaphragm pump was used as the feeding pump, and the discharge pressure of the pump was kept at 0.5 MPa. The pressure on the raw material liquid 101 just before vaporizer 3 was set to 0.02-0.3 MPa. $N_2$ was used as carrier gas. 02 was used as the premixed gas 103. The flow rate of the raw material mixed gas 104 flowing through the raw material gas pipe 10 was adjusted in the range of 20 to 80 [SLM] and supplied to the burner 11.

When the raw material mixed gas 104 was fed into the raw material gas pipe 10 under the above conditions, no re-liquefaction occurred in the raw material gas pipe 10 or in the burner 11.

Comparative Example 1

A single-layer insulation structure was used for heat insulation of the raw material gas pipe 10, with silicone sponge tubes as the insulation material. The thickness of the silicone sponge tube was set to 0.005 [m]. The conditions were the same as in Example 1, except for the heat-insulation structure.

When the raw material mixed gas 104 was fed into the raw material gas pipe 10 under the above conditions, re-liquefaction occurred in the raw material gas pipe 10 in the movable cable protector 17.

Comparative Example 2

A single-layer insulation structure was used for heat insulation of the raw material gas pipe 10, with silicone sponge tubes as the insulation material. The thickness of the silicone sponge tube was set to 0.015 [m]. The conditions were the same as in Example 1, except for the heat-insulation structure.

When the raw material mixed gas 104 was fed into the raw material gas pipe 10 under the above conditions, re-liquefaction occurred in the raw material gas pipe 10 in the movable cable protector 17.

Comparative Example 3

A single-layer insulation structure was used for heat insulation of the raw material gas pipe 10, with silicone sponge tubes as the insulation material. The thickness of the silicone sponge tube was set to 0.015 [m]. Up to the inlet of the movable cable protector 17 (i.e., the most upstream end), the raw material gas pipe 10 was heated by an electric heater to a temperature of 230° C. Other than these insulation structures and heating mechanisms, the conditions were the same as in Example 1.

When the raw material mixed gas 104 was fed into the raw material gas pipe 10 under the above conditions, the gel was deposited in the raw material gas pipe 10, although no re-liquefaction occurred in the raw material gas pipe 10 or in the burner 11. This is due to the fact that the raw material mixed gas 104 was overheated at a high temperature, resulting in the formation of polymerized products caused by the raw material and impurities contained therein. In addition, silicone sponge tubes, which are the insulation material, were used above the heat resistance temperature, resulting in rapid deterioration of the insulation material.

Table 1 summarizes the insulation structure, insulation thickness, temperature of the raw material gas pipe 10 at the inlet of the movable cable protector 17, and re-liquefaction/gelation in the raw material gas pipe 10 for Examples 1, 2, and Comparative Examples 1-3.

outside air h is 7 [W/m²/K]. The temperature $T_3$ at the surface of the outer layer heat-insulation material under the same conditions is shown by rectangular markers in FIG. 6.

Figure 5:
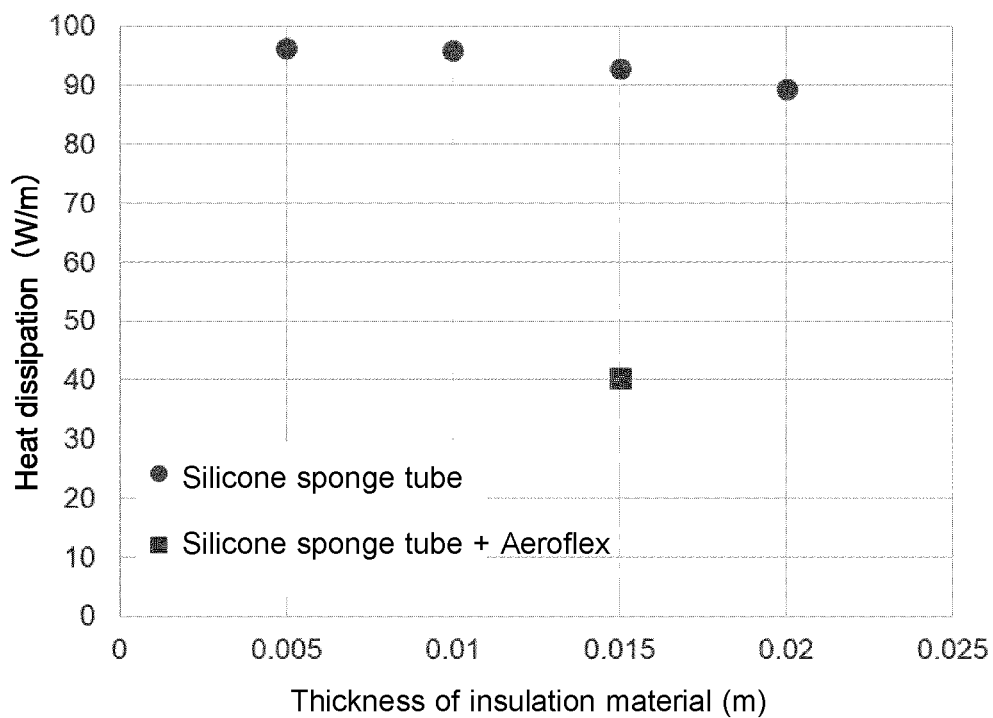
FIG. 5 shows a graph comparing the amount of heat dissipation in a double-insulated structure with that in a single-insulated structure.

As a comparison, the heat dissipation Q [W/m] is shown by circular markers in FIG. 5; when the insulation structure of the raw material gas pipe 10 is a single insulation structure, the outer diameter d of the raw material gas pipe 10 is 0.01 [m], the temperature T1 of the raw material gas pipe 10 is 190 [° C.], the outside air temperature T2 is 30 [° C.], the thickness $t_1$ of the silicone sponge tube as an

TABLE 1

| | Heat-insulating Structure | Thickness of Inner Layer Heat-insulation Material 18 [m] | Thickness of Outer Layer Heat-insulation Material 19 [m] | Temperature at Inlet of Raw Material Gas Pipe 10 [° C.] | Re-liquefaction/ Gelation |
|---|---|---|---|---|---|
| Example 1 | Double Insulation | 0.005 | 0.01 | 190 | Not occur |
| Example 2 | Double Insulation | 0.005 | 0.01 | 190 | Not occur |
| Comparative Example 1 | Single Insulation | 0.005 | — | 190 | Re-liquefaction occurred |
| Comparative Example 2 | Single Insulation | 0.015 | — | 190 | Re-liquefaction occurred |
| Comparative Example 3 | Single Insulation | 0.015 | — | 230 | Gelation occurred |

In general, when the outer diameter of the raw material gas pipe is d, the temperature of the raw material gas pipe is $T_1$, the temperature of the outside air is $T_2$, and the temperature of the surface of the outer layer heat-insulation material is $T_3$, the thickness of the inner layer heat-insulation material is $t_1$, the thickness of the outer layer heat-insulation material is $t_2$, the thermal conductivity of the inner layer heat-insulation material is $\lambda_1$, the thermal conductivity of the outer layer heat-insulation material is $\lambda_2$, the surface thermal emissivity is $\sigma$, and the convective heat transfer coefficient to the outside air is h, the amount of heat dissipation to the outside air Q is expressed as equation (1) and equation (2).

[Formula 1]

$$Q=(T_3-T_2)\times h\times(d+2\times(t_1+t_2))\times a+(T_3+273)^4-(T_2+273)^4)\times\sigma\times 5.67\times 10^{-8}\times(d+2\times(t_1+t_2))\times\pi \quad (1)$$

$$Q=2\times\pi\times(T_1-T_3)/(\ln((d/2+t_1)/(d/2)/\lambda_1+\ln((d/2+t_1+t_2)/(d/2+t_1)/\lambda_2)) \quad (2)$$

where $5.67\times 10^{-8}$ in equation (1) is the Stefan-Boltzmann constant.

By solving equations (1) and (2), the temperature $T_3$ at the surface of the outer layer heat-insulation material and the amount of heat dissipation Q from the surface of the insulation materials to the outside air can be obtained.

The heat dissipation Q is shown by rectangular markers in FIG. 5 when the insulation structure of the raw material gas pipe 10 is a double insulation structure, outer diameter d of the raw material gas pipe 10 is 0.01 [m], temperature T1 of the raw material gas pipe 10 is 190 [° C.], outside air temperature T2 is 30 [° C.], the thickness t1 of the silicone sponge tube, which is the inner layer heat-insulation material is 0.005 [m], the thickness t2 of Aeroflex, which is the outer layer heat-insulation material, is 0.01 [m], the thermal conductivity $\lambda 1$ of the silicone sponge tube is constant regardless of temperature, the thermal conductivity $\lambda 1$=0.2 [W/m/K], the thermal conductivity $\lambda 2$ of Aeroflex is constant regardless of temperature, thermal conductivity $\lambda 2$=0.04 [W/m/K], the thermal emissivity $\sigma$ of the surface is 0.7, and the convective heat transfer coefficient to the insulation material is changed to 0.005, 0.001, 0.015, and 0.020 [m], the thermal conductivity $\lambda 1$ is constant regardless of temperature, the thermal conductivity $\lambda 1$=0.2 [W/m/K], the surface heat emissivity $\sigma$=0.7 and the convection heat transfer coefficient to the outside air h=7 [W/m²/K]. The temperature $T_3$ [° C.] at the surface of the outer layer heat-insulation material under the same conditions is shown by circular markers in FIG. 6.

Figure 6:
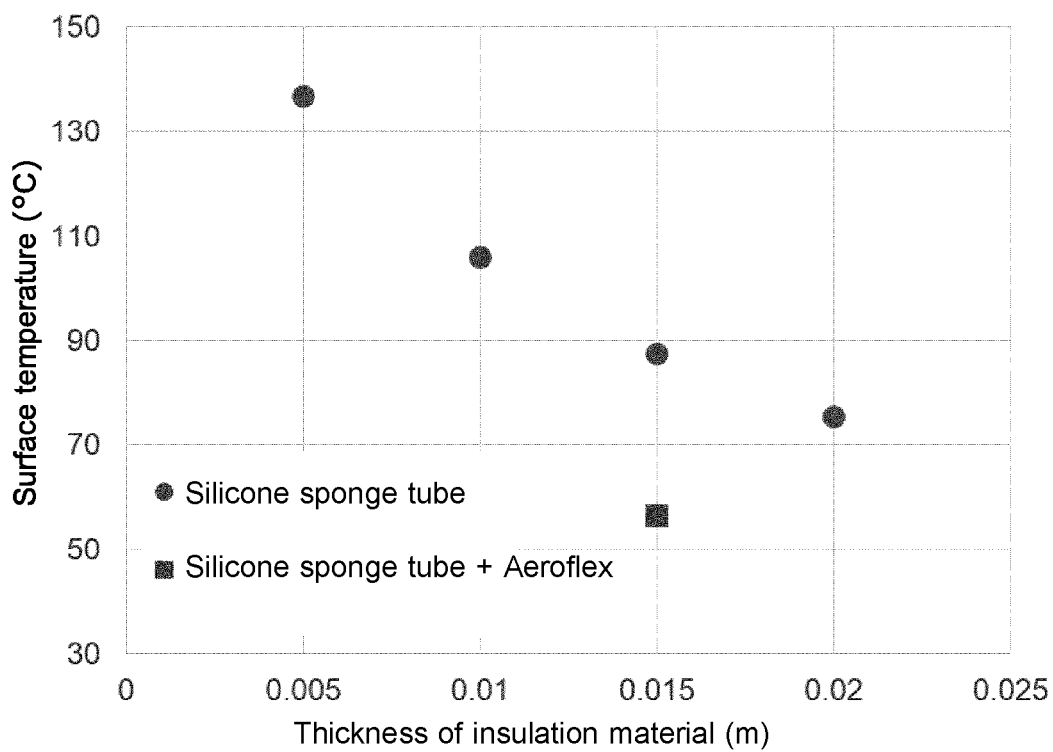
FIG. 6 shows a graph comparing the surface temperature of the insulation material when double insulation is used and when single insulation is used.

FIG. 5 shows that the double insulation structure of the silicone sponge tube and Aeroflex has less than half the heat dissipation Q at the same thickness of 0.015 [m] compared to the single insulation structure of the silicone sponge tube. FIG. 6 shows that, with respect to the temperature $T_3$ on the surface of the outer layer heat-insulation material, it is 30 [° C.] lower in the double insulation structure than in the single insulation structure at the same thickness of 0.015 [m].

REFERENCE SIGNS LIST

1 Liquid mass flow controller
2 Raw material liquid pipe
3 Vaporizer
4 Gas Mass Flow Controller
5 Carrier gas pipe
6 Heat Exchanger
7 Gas mass flow controller
8 Premixed gas pipe
9 Heat Exchanger
10 Raw material gas pipe
11 Burner
12 Guide mechanism
13 Starting base material
14 Rotating mechanism
15 Soot deposit
16 Exhaust hood
17 Movable cable protector
18 Inner layer heat-insulation material
19 Outer layer heat-insulation material
20 Open/close valve
21 Purge gas pipe 22 Open/close valve
23 Flow rate control means
24 Check valve
25 Liquid mass flow meter
26 Liquid-gas mixer (control valve)
27 Gas mass flow controller
28 Carrier gas pipe
101 Raw material liquid
102 Carrier gas
103 Premixed gas
104 Raw material mixed gas
105 Purge gas
106 Carrier gas

The invention claimed is:

1. A porous glass base material manufacturing apparatus that releases gas of organic siloxane raw materials into the flame of a group of burners that moves relative to a starting base material along the longitudinal direction of the starting base material rotating around a rotation axis along the longitudinal direction to form soot of porous glass particles on the surface of the starting base material, comprising:
   a vaporizer that vaporizes liquid raw materials containing organic siloxane in a liquid state supplied from a raw material tank to make a raw material mixed gas mixed with raw material gas and carrier gas; and
   a raw material gas pipe that supplies the raw material mixed gas to a burner of the group of burners,
   wherein the raw material gas pipe is insulated and kept warm by double insulation, which is a combination of an inner layer heat-insulation material provided on the outside of the raw material gas pipe and an outer layer heat-insulation material provided on the outside of the inner layer heat-insulation material,
   wherein an insulation material with a heat resistance temperature of 160° C. or higher and a thermal conductivity greater than that of the outer insulating material is used for the inner layer heat-insulation material, and
   an insulation material with thermal conductivity of 0.05 W/m/K or less (at 20° C.) and a heat resistance temperature lower than that of the inner insulating material is used for the outer layer heat-insulation material.

2. The porous glass base material manufacturing apparatus according to claim 1, wherein the organic siloxane is octamethylcyclotetrasiloxane (OMCTS).

3. The porous glass base material manufacturing apparatus according to claim 1, further comprising a heater that heats the raw material gas pipe to a temperature of 140-220° C., wherein the raw material gas pipe is heated and kept at a temperature of 140-220° C.

4. The porous glass base material manufacturing apparatus according to claim 1, further comprises a liquid mass flow controller that controls the flow rate of the organic siloxane raw material in a liquid state supplied from the raw material tank to the vaporizer,
   wherein the vaporizer mixes the organic siloxane raw material with the carrier gas and vaporizes the liquid raw material to make the raw material mixed gas in which the raw material gas and the carrier gas are mixed.

5. The porous glass base material manufacturing apparatus according to claim 1, further comprises:
   a liquid mass flow meter that measures the flow rate of organic siloxane raw material in the liquid state supplied from the raw material tank; and
   a liquid gas mixer that has a control valve that controls the flow rate of liquid raw material based on feedback from the liquid mass flow meter and mixes liquid raw material and carrier gas,
   wherein the vaporizer vaporizes the liquid raw material mixed with the carrier gas by the liquid gas mixer to make the raw material mixed gas in which the raw material gas and the carrier gas are mixed.

* * * * *